April 11, 1939.   M. D. KENNEDY ET AL   2,153,572
METHOD AND APPARATUS FOR DRYING FRUIT AND THE LIKE
Filed Sept. 28, 1935

Inventors
Mabry D. Kennedy and
J. Gordon Johnson

Attorney

Patented Apr. 11, 1939

2,153,572

UNITED STATES PATENT OFFICE 2,153,572

METHOD AND APPARATUS FOR DRYING FRUIT AND THE LIKE

Mabry D. Kennedy and John Gordon Johnson, Orlando, Fla.

Application September 28, 1935, Serial No. 42,682

6 Claims. (Cl. 34—24)

This invention relates to fruit treating machines and more particularly to a method and apparatus for drying fruit.

Heretofore, it has been proposed to dry fruit, after it has been subjected to a conventional washing treatment, by exposing the wet fruit to an air blast and simultaneously imparting rotation thereto in order to present different surfaces of the fruit to direct action of the air. It has also been suggested to remove the adhering moisture from the surface of fruit by contacting the wet fruit with rollers having non-absorbent surfaces and then removing the liquid transferred to the roller surfaces by means of squeegees or other devices.

In our copending application Ser. No. 709,636, filed February 3, 1934, we have disclosed a method of drying fruits and vegetables wherein the fruit is contacted with a rapidly rotating brush, the centrifugal force developed by the brush being utilized to throw off the liquid removed from the surfaces of the fruit. The present invention is an improvement over prior art arrangements and provides a quick and effective means for completely removing moisture from the surface of the fruit and also from the fruit supporting members, used to support and advance the fruit during its passage through the machine.

An object of the invention is to provide an improved method and apparatus for drying fruit and like globular shaped articles.

A further object of the invention is to provide a machine for drying fruit wherein the fruit is brought into rotating contact with a brushing medium at predetermined positions of its path of travel through the machine.

Another object of the invention is to provide an improved machine for drying fruit, constructed and arranged whereby moisture is removed from the fruit by direct contact with a wiping medium which is also adapted to remove moisture from the members used to support the fruit during its passage through the machine, the speed of rotation of the brushing medium being sufficient to dispel by centrifugal force the moisture removed from the surface of the fruit and supporting rollers.

Yet another object of the invention is to provide a machine for drying fruit and like globular shaped articles wherein the fruit or other articles are rotatively contacted with a rotating wiping medium, the centrifugal action of the wiping medium being utilized to withdraw moisture from the members upon which the fruit is supported during its movement through the machine.

A still further object of the invention is to provide an improved method for drying fruit by contacting the fruit with a wiping medium at predetermined positions of its path of travel and simultaneously removing adhering moisture from the exposed areas of the fruit and the fruit supporting members.

With these and other objects in view, which may be incident to our improvements, the invention consists in the parts and combinations to be hereinafter set forth and claimed with the understanding that the several necessary elements, comprising our invention may be varied in construction, proportions and arrangement, without departing from the spirit and scope of the appended claims.

In order to make our invention more clearly understood, we have shown in the accompanying drawing means for carrying the same into practical effect, without limiting the improvements in their useful applications to the particular constructions, which for the purpose of explanation, have been made the subject of illustration.

Figure 1:
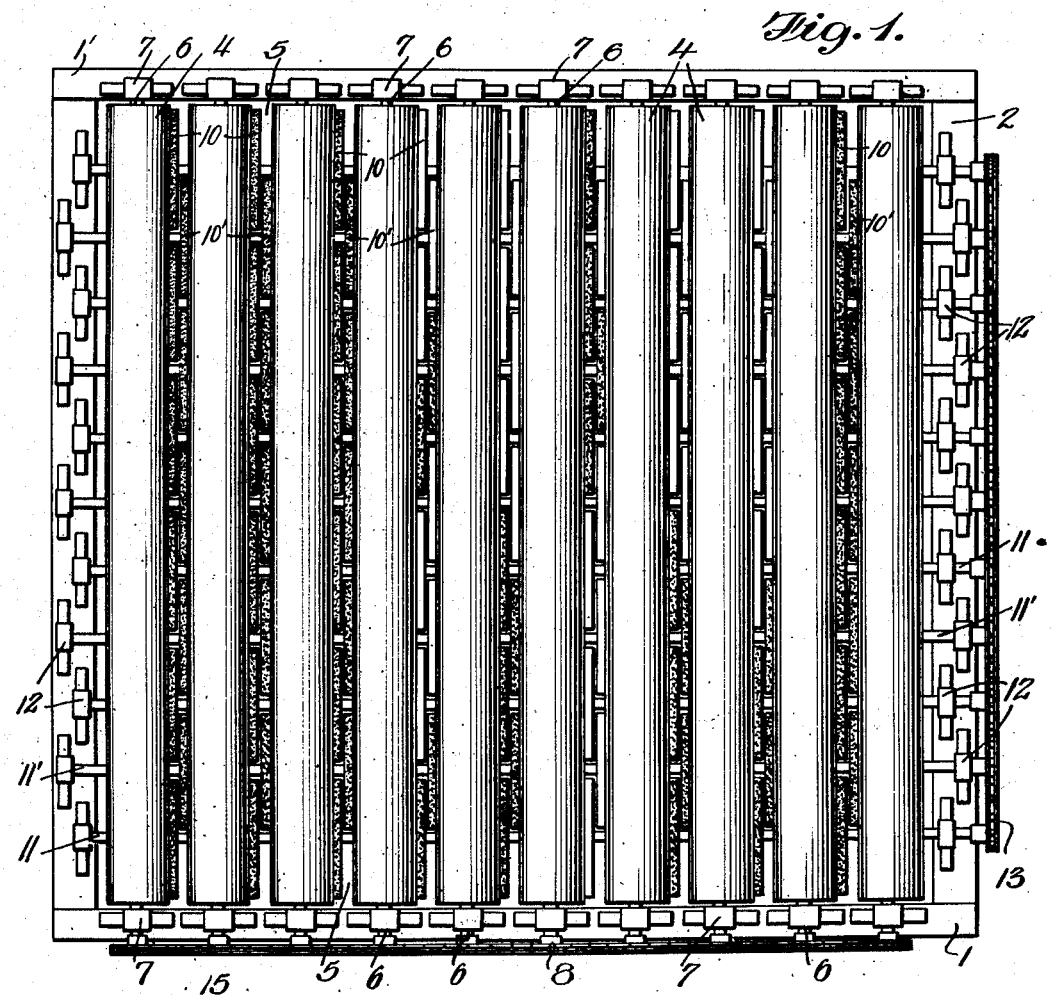
Figure 1 is a plan view of one form of apparatus embodying the present invention.

Referring to the drawing, the apparatus comprises a substantially rectangular shaped base or frame formed with side members 1—1' and end members 2—2', the frame being mounted upon suitable supports 3. Between the side members are mounted a plurality of plain metal rollers 4, spaced apart to provide a series of grooves 5, the roller shafts 6 being supported in bearing members 7 attached to the side pieces. The rollers are adapted to be rotated by a source of power, not shown, through the medium of sprockets 8 and chain or belt drive means 9.

Mounted below and projecting upwardly into the grooves 5 between successive rollers, are a plurality of thin circular brushes 10—10' supported upon shafts 11—11' between end members 2—2'. The brush shafts are mounted in suitable bearings 12 and are adapted to be rotated by means of a belt or chain drive 13. The ends of the shafts are provided with sprockets 14 adapted to mesh with each other whereby alternate sets of brushes rotate in opposite directions.

Figure 2:
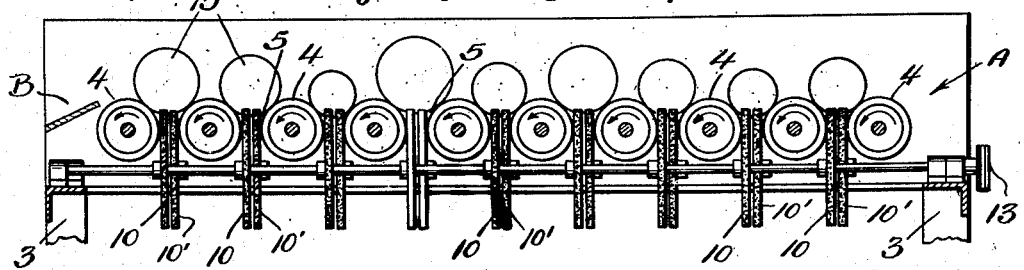
Fig. 2 is a sectional view taken along line 2—2 of Figure 1.

Referring to Figure 2, it will be noted that the thin brushes 10—10' extend upwardly into grooves 5 and contact with the exposed area of a piece of fruit 15 resting in the grooves formed between successive rollers. It will be further noted that brushes 10—10' do not touch the surfaces of the rollers 4 but are mounted and so arranged that they are in close proximity to the rollers whereby the moisture adhering to the rollers may be transferred to the brushes and dispelled to atmosphere.

It will be appreciated that in the treatment of fruit, and particularly in the drying of wet fruit, it is necessary that the fruit be actuated in such a manner as to present all surfaces thereof to the action of the brushing medium and at the same time prevent any tendency of the fruit to spin upon a fixed axis. This is particularly true in machines of the character wherein the fruit is contacted with rapidly revolving brushes, for the reason that, if the fruit is permitted to spin on a fixed axis, it will become damaged by contact with a speeding brush. By means of our improved method and apparatus, the fruit is wiped by the high speed brushes as it passes through the machine and due to the speed of rotation of the brushes, accumulated surface moisture is withdrawn from the rollers, although the brushes do not touch the supporting rollers. In this manner, the combination of the centrifugal action on the fruit and surface action on the rollers are utilized to dry the fruit.

Figure 3:
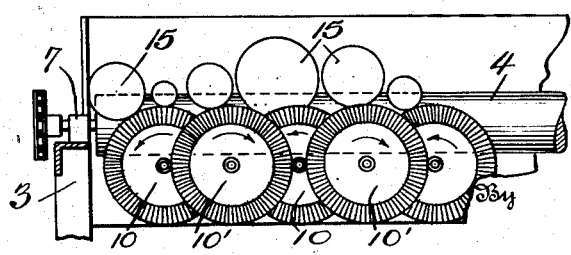
Fig. 3 is a sectional view taken along line 3—3 of Figure 2.

Referring to Figure 3, it will be seen that the brushes 10—10', due to the arrangement of the sprockets 14 mounted upon shafts 11—11', rotate in opposite directions. It will be noted that the pieces of fruit 15 are contacted at various different points as the fruit moves across rollers 4 into the grooves 5 while passing through the machine.

In the operation of the apparatus, referring more particularly to Figure 2, the fruit 15 to be dried, enters the machine at A and is fed onto the rollers so as to pass transversely thereof and across the machine. Rollers 4, which are rotated in the same direction, turn the fruit through friction in the opposite direction and in the movement of the fruit through the machine, it is brought into contact with the brushes projecting into the grooves between the rollers. Brushes 10—10', rotating in opposite directions, tend to rotate the fruit in a direction at 90° to that of the cylinders, each tending to reverse the direction of rotation from the brush next to it. When one groove is full of fruit, substantially every other fruit in this groove is being wiped by the brushes; when the fruit moves to the next groove, the untouched fruit in the first groove is thereby contacted with the brushes extending up into the adjoining groove until the fruit reaches the last groove and is then discharged at B.

It has been found that fruit treated according to the present invention is much enhanced in appearance immediately after the drying treatment and does not require a prolonged polishing. This is no doubt due, in a measure, to the action of the brushes on the wet surface of the fruit, in combination with the turning and twisting motion imparted to the fruit by the supporting rollers and the brushes. Each individual fruit is being constantly turned about a different axis and in each groove a new area of contact is exposed to the action of the rotating brushes. Since the wash liquid is removed simultaneously from the supporting rollers and the fruit, it is evident that as the fruit nears the exit end of the machine, that the rollers, fruit and brushes are substantially dry. As a matter of fact, during the last stage of the drying operation, that is, when the fruit is passing over the rollers at the discharge end of the machine, the device is functioning as a polisher.

In addition to the mechanical contact between the brushes and the fruit, it will be noted that a considerable volume of air is moved by the rapidly revolving brushes, which air acts directly upon the fruit and also the rollers, thereby aiding in the removal of moisture. While it has been suggested to use plain metal rollers, it will be appreciated that other types of material may be used, as long as the surfaces of the rollers are substantially non-absorbent. Guards may be provided to direct the blasts of air generated by the revolving brushes to points whereby more effective supplemental drying of the rollers can be obtained and means may also be provided to maintain the fruit on the machine, that is, to prevent it from rolling off at the sides during its passage through the machine.

While we have shown and described the preferred embodiment of our invention, we wish it to be understood that we do not confine ourselves to the precise details of construction herein set forth, by way of illustrations, as it is apparent that many changes and variations may be made therein, by those skilled in the art, without departing from the spirit of the invention, or exceeding the scope of the appended claims.

We claim:

1. A machine for drying fruit and the like comprising a plurality of rollers mounted in parallel relationship and adapted to move fruit transversely thereof, the surfaces of said rollers being of a substantially non-absorbent character, said rollers forming a supporting medium for the fruit during its passage through the machine, the axes of the rollers being spaced to provide fruit supporting grooves between successive rollers, means to remove moisture from the under surfaces of the fruit while the fruit is in the grooves, comprising a plurality of rotatable brushes mounted in spaced relationship with respect to the length of the rollers with a portion of their brushing surfaces extending into the fruit supporting grooves and adapted to contact with said exposed under surfaces of the fruit and a source of power adapted to drive the rollers and rotate the brushes.

2. A machine for drying fruit and the like comprising a plurality of rollers mounted in parallel relationship and adapted to move fruit transversely thereof, said rollers forming a supporting medium for the fruit during its passage through the machine, the axes of the rollers being spaced to provide fruit supporting grooves between successive rollers, means to remove moisture from the surfaces of the fruit while the fruit is in the grooves comprising a plurality of rotatable brushes mounted in spaced relationship with respect to the length of the rollers, the axes of said brushes being perpendicular to the axes of the rollers with a portion of the brushing medium extending into the fruit supporting grooves, whereby the brushing medium contacts with the exposed surfaces of the fruit and a source of power adapted to drive the rollers and rotate the brushes.

3. The method of drying fruit and like globular shaped articles comprising moving the fruit to be dried transversely of a plurality of rollers arranged to form fruit supporting grooves therebetween, contacting the surface of a fruit which is exposed while the fruit is in a groove with a rotating moisture absorbing medium, transferring the moisture from the exposed area of the fruit to the moisture absorbing medium and centrifugally displacing the absorbed moisture from said medium along a path below the fruit.

4. The method of drying fruit and like globular shaped articles comprising moving the fruit to be dried transversely of a plurality of rollers arranged to form fruit supporting grooves therebetween, contacting the under surfaces of the fruit which are exposed between the rollers while the fruit is supported in the grooves with a rotating moisture absorbing medium, transferring the moisture from the exposed areas of the fruit to the moisture absorbing medium and displacing the absorbed moisture from said medium along a path below the fruit.

5. The method of drying fruit and like globular shaped articles comprising moving the fruit to be dried transversely of a plurality of rollers arranged to form fruit supporting grooves therebetween, contacting the under surfaces of the fruit which are exposed while the fruit is supported in the grooves with a rotating moisture absorbing medium, transferring the moisture from the exposed areas of the fruit and the supporting rollers to the moisture absorbing medium and centrifugally displacing the absorbed moisture from said medium and the supporting rollers along a path below the fruit.

6. The method of drying fruit and like globular shaped articles comprising moving the fruit to be dried transversely of a plurality of rollers having surfaces of a substantially non-absorbent character and arranged to form fruit supporting grooves therebetween, contacting the under surface of a fruit which is exposed while the fruit is in a groove with a rotating moisture absorbing medium, simultaneously transferring the moisture from the exposed area of the fruit and the moisture adhering to the surface of a roller to the moisture absorbing medium and displacing the resultant absorbed moisture from said medium along a path below the fruit.

MABRY D. KENNEDY.
J. GORDON JOHNSON.